United States Patent
Johnston

(10) Patent No.: US 9,270,095 B2
(45) Date of Patent: Feb. 23, 2016

(54) CUTTING TOOL FOR CABLE WITH A METAL SHIELD

(75) Inventor: Ronald Johnston, El Cajon, CA (US)

(73) Assignee: Solar Turbines Incorporated, San Diego, CA (US)

( * ) Notice: Subject to any disclaimer, the term of this patent is extended or adjusted under 35 U.S.C. 154(b) by 465 days.

(21) Appl. No.: 13/174,377

(22) Filed: Jun. 30, 2011

(65) Prior Publication Data

US 2013/0000128 A1   Jan. 3, 2013

(51) Int. Cl.
*H02G 1/12* (2006.01)
*B23D 21/02* (2006.01)
*B23D 21/06* (2006.01)

(52) U.S. Cl.
CPC ............ *H02G 1/126* (2013.01); *H02G 1/1209* (2013.01); *H02G 1/1217* (2013.01); *H02G 1/1239* (2013.01); *H02G 1/1253* (2013.01); *B23D 21/02* (2013.01); *B23D 21/06* (2013.01); *H02G 1/1219* (2014.07); *H02G 1/1229* (2013.01); *H02G 1/1263* (2014.07); *Y10T 83/04* (2015.04)

(58) Field of Classification Search
CPC . H02G 1/1229; H02G 1/1231; H02G 1/1253; H02G 1/126; H02G 1/1263; H02G 1/1209; H02G 1/1212; H02G 1/1214; H02G 1/1217; H02G 1/1219; H02G 1/1239; H02G 1/1268; B23D 21/02; B23D 21/06
USPC ............ 30/90.7, 90.4, 90.9, 90.8, 91.1, 91.2, 30/92.5
IPC ............... H02G 1/1229, 1/1231, 1/1253, 1/126, H02G 1/1263
See application file for complete search history.

(56) References Cited

U.S. PATENT DOCUMENTS

| | | | | | |
|---|---|---|---|---|---|
| 2,778,105 | A | * | 1/1957 | Carta | 30/90.7 |
| 3,169,315 | A | * | 2/1965 | Mankovitz | 30/90.6 |
| 3,215,007 | A | * | 11/1965 | Stallings | 30/90.9 |
| 3,851,387 | A | | 12/1974 | Ducret | |
| 4,055,097 | A | | 10/1977 | Ducret | |
| 4,103,578 | A | | 8/1978 | Ducret | |
| 4,127,937 | A | * | 12/1978 | Harless et al. | 30/90.7 |
| 4,142,290 | A | | 3/1979 | Ducret | |
| 4,169,400 | A | | 10/1979 | Ducret | |
| 4,265,016 | A | | 5/1981 | Ducret | |
| 4,267,636 | A | | 5/1981 | Ducret | |
| 4,359,819 | A | | 11/1982 | Ducret | |
| 4,437,237 | A | | 3/1984 | Ducret | |
| 4,476,754 | A | | 10/1984 | Ducret | |
| 4,489,490 | A | * | 12/1984 | Michaels et al. | 30/90.1 |
| 4,674,183 | A | | 6/1987 | Ducret | |
| 4,683,350 | A | | 7/1987 | Ducret | |
| 4,735,117 | A | | 4/1988 | Ducret | |
| 4,769,909 | A | | 9/1988 | Ducret | |
| 4,793,063 | A | | 12/1988 | Ducret | |
| 4,821,414 | A | | 4/1989 | Ducret | |
| 4,955,137 | A | * | 9/1990 | Matthews | 30/90.1 |
| 4,977,671 | A | | 12/1990 | Ducret | |
| 5,337,479 | A | | 8/1994 | Ducret | |

(Continued)

*Primary Examiner* — Clark F Dexter
(74) *Attorney, Agent, or Firm* — Leydig, Voit & Mayer, Ltd.

(57) ABSTRACT

A tool for cutting and slitting the shielding of an electrical cable includes a cutting platform configured to engage the shield of the cable. A driven cutting blade is mounted for movement past the cutting platform into the shield. A fixture is provided for supporting the cable in a desired orientation during a cutting or slitting operation. The fixture includes a first cable support that defines a ring cut plane and a second cable support that defines a slitting plane.

13 Claims, 5 Drawing Sheets

(56) References Cited

U.S. PATENT DOCUMENTS

| | | |
|---|---|---|
| 5,611,146 A | 3/1997 | Ducret |
| 5,806,187 A | 9/1998 | Ducret |
| 5,809,652 A | 9/1998 | Ducret |
| 6,044,744 A * | 4/2000 | Eslambolchi et al. ......... 83/880 |
| 6,308,417 B1 | 10/2001 | Ducret |
| 6,463,654 B1 * | 10/2002 | Moore ........................ 29/825 |
| 6,662,450 B1 | 12/2003 | Ducret |
| 7,554,041 B2 | 6/2009 | Ducret |
| 2004/0020062 A1 | 2/2004 | Ducret |
| 2004/0055160 A1 | 3/2004 | Ducret |
| 2005/0066528 A1 | 3/2005 | Ducret |
| 2006/0021482 A1 | 2/2006 | Ducret |
| 2006/0021483 A1 | 2/2006 | Ducret |
| 2006/0024142 A1 | 2/2006 | Ducret |
| 2007/0144011 A1 | 6/2007 | Ducret |
| 2008/0047147 A1 | 2/2008 | Ducret |
| 2008/0156526 A1 | 7/2008 | Ducret |

* cited by examiner

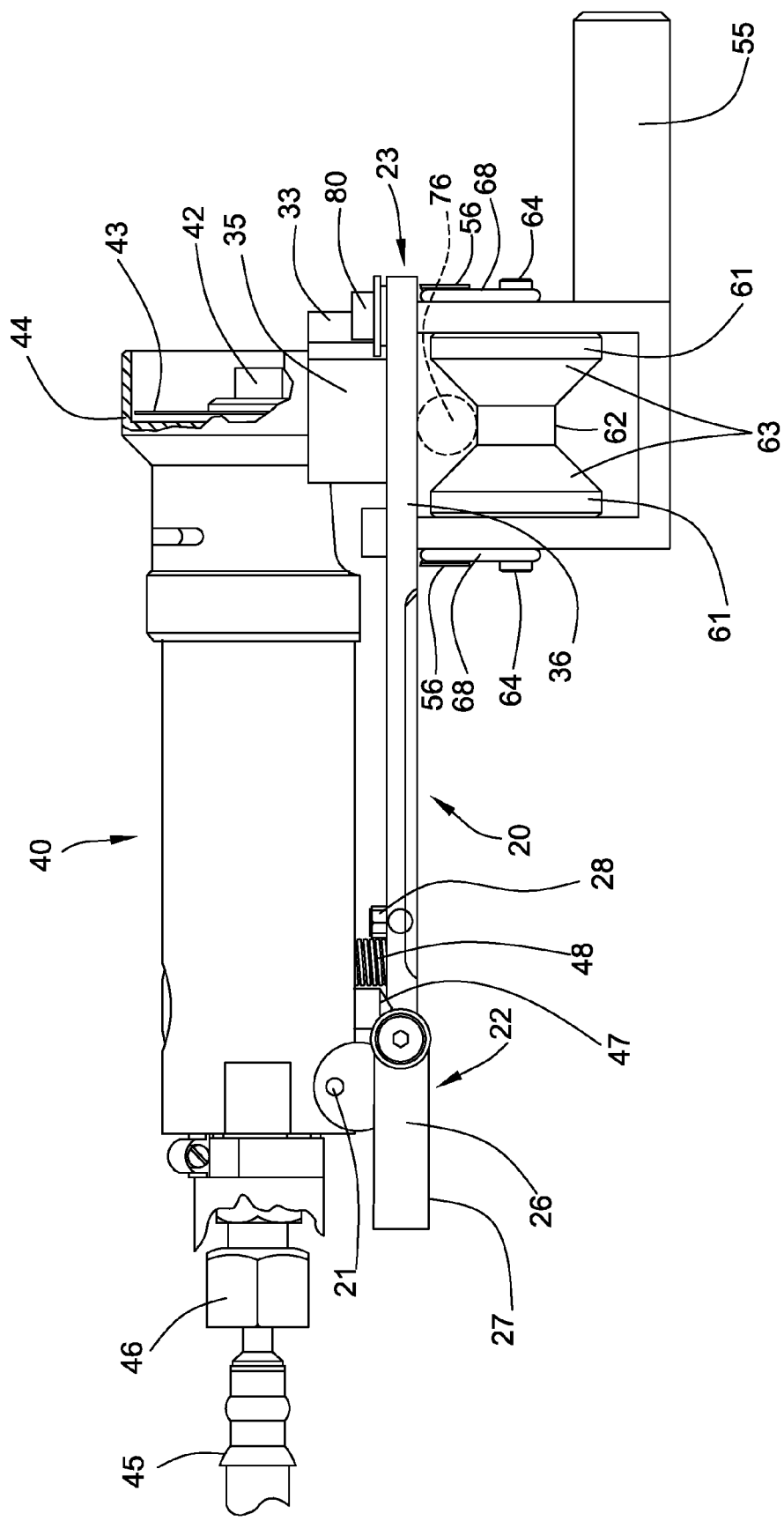

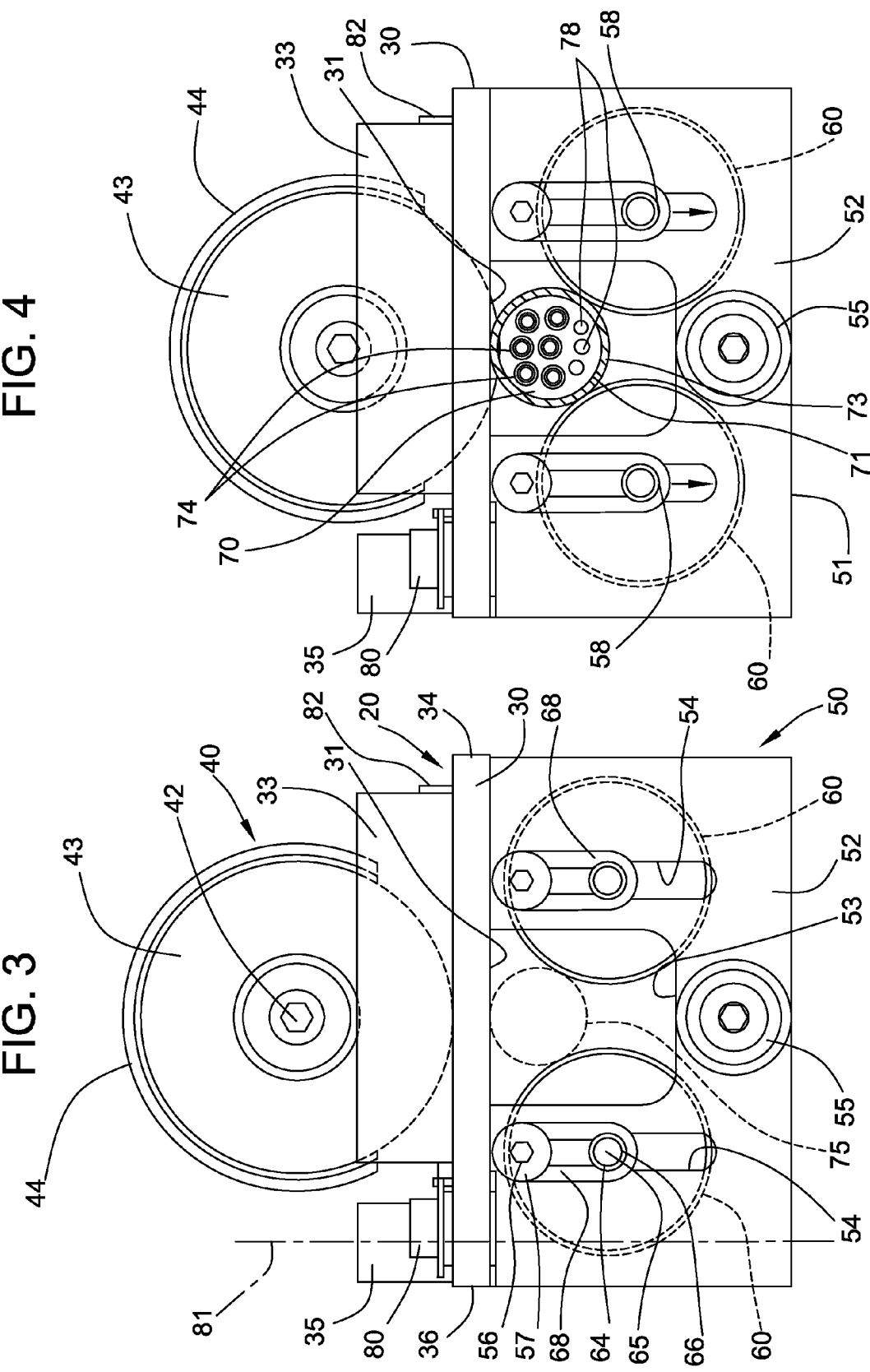

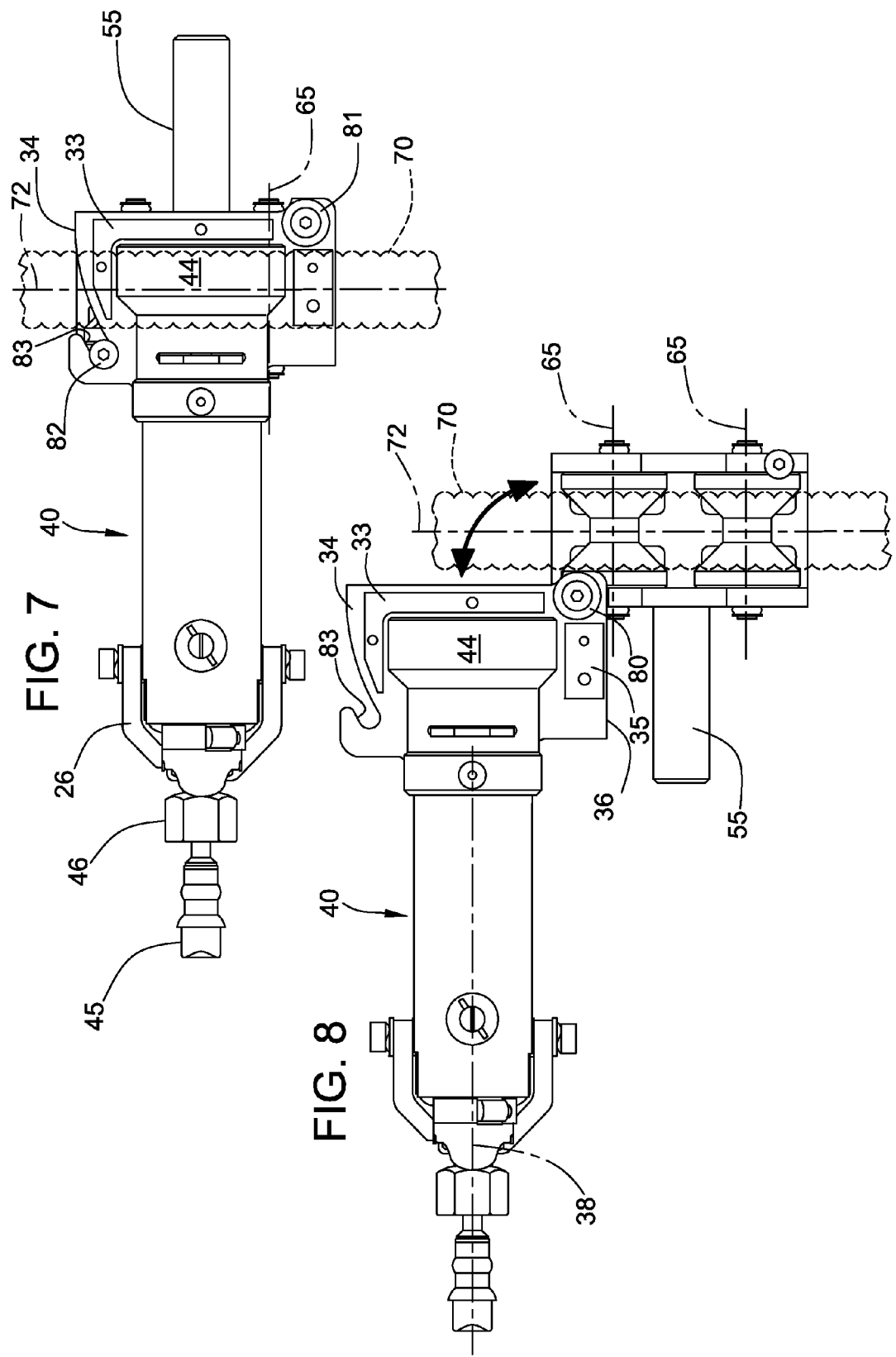

CUTTING TOOL FOR CABLE WITH A METAL SHIELD

TECHNICAL FIELD

This disclosure relates generally to a tool for cutting a metal shield of a cable and, more particularly, to a hand tool for cutting and slitting the metal shield of the cable.

BACKGROUND

Cables used for conducting power often have a plurality of insulated conductors surrounded by a metal shield or cover to protect the conductors. One type of such cable is known as metal clad armored cable and includes an elongated outer metal shield or sheath that serves to protect insulated conductors that extend through the inner passageway defined by the shield. The metal shield is typically formed with a helically wound shape with adjacent convolutions overlapping and interlocking with one another to provide a flexible metal conduit that facilitates installation and routing of the cable. Some cables include an insulator surrounding the metal shield and/or uninsulated conductors within the shield for grounding purposes. In some applications, the cables may be configured for use in hazardous locations. Still further, shields may be formed of steel (including hardened steel) or aluminum and, in come cases, the convolutions may be welded together. Removing a section of the metal shield from such a cable to expose the conductors may be performed using hand-held or hand tools or with more highly complex tools such as those configured to be positioned at a bench or a work station.

U.S. Patent Publication No. US 2007/0144011 A1 discloses a tool having a rotating cutting wheel for cutting the shield of a cable and also cutting the core of the cable. A cutting operation is performed by pivoting the spindle unit on a support unit to move the cutting wheel towards the cable. The depth that the cutting wheel extends into the cable may be adjusted through the use of a thumb screw.

SUMMARY

A tool for cutting the shielding of an electrical cable is provided. In one aspect, the tool includes a base having a cutting platform configured to engage the shield of the cable. A cutting blade is mounted for movement relative to the cutting platform between a first position spaced from the cutting platform and a second position at which the cutting blade extends past the cutting platform. A drive mechanism is operatively connected to the cutting blade. A fixture is provided for supporting the cable in a desired orientation. The fixture includes a first cable support defining a ring cut plane and a second cable support defining a slitting plane. The ring cut plane and the slitting plane are generally perpendicular to each other.

In another aspect, a method of cutting a metal shield on a cable is provided. A cutting platform is positioned generally adjacent a fixture with the cable positioned between the fixture and the cutting platform and the metal shield of the cable engaging the cutting platform. A cutting blade is rotatably driven and is moved past the cutting platform and into contact with the metal shield of the cable. The cutting platform is moved relative to the cable to cut the metal shield in a desired direction.

BRIEF DESCRIPTION OF THE DRAWINGS

FIG. 2 is a side elevational view of the tool of FIG. 1;

FIG. 3 is an end view of the tool of FIG. 1;

FIG. 4 is an end view similar to FIG. 3 but with the shield of a cable shown being cut by the tool;

FIG. 7 is a top plan view similar to FIG. 5 but with a cable oriented for a slitting operation; and FIG. 8 is a top plan view similar to FIG. 7 but with the fixture in a slit loading position.

DETAILED DESCRIPTION

Figure 1:
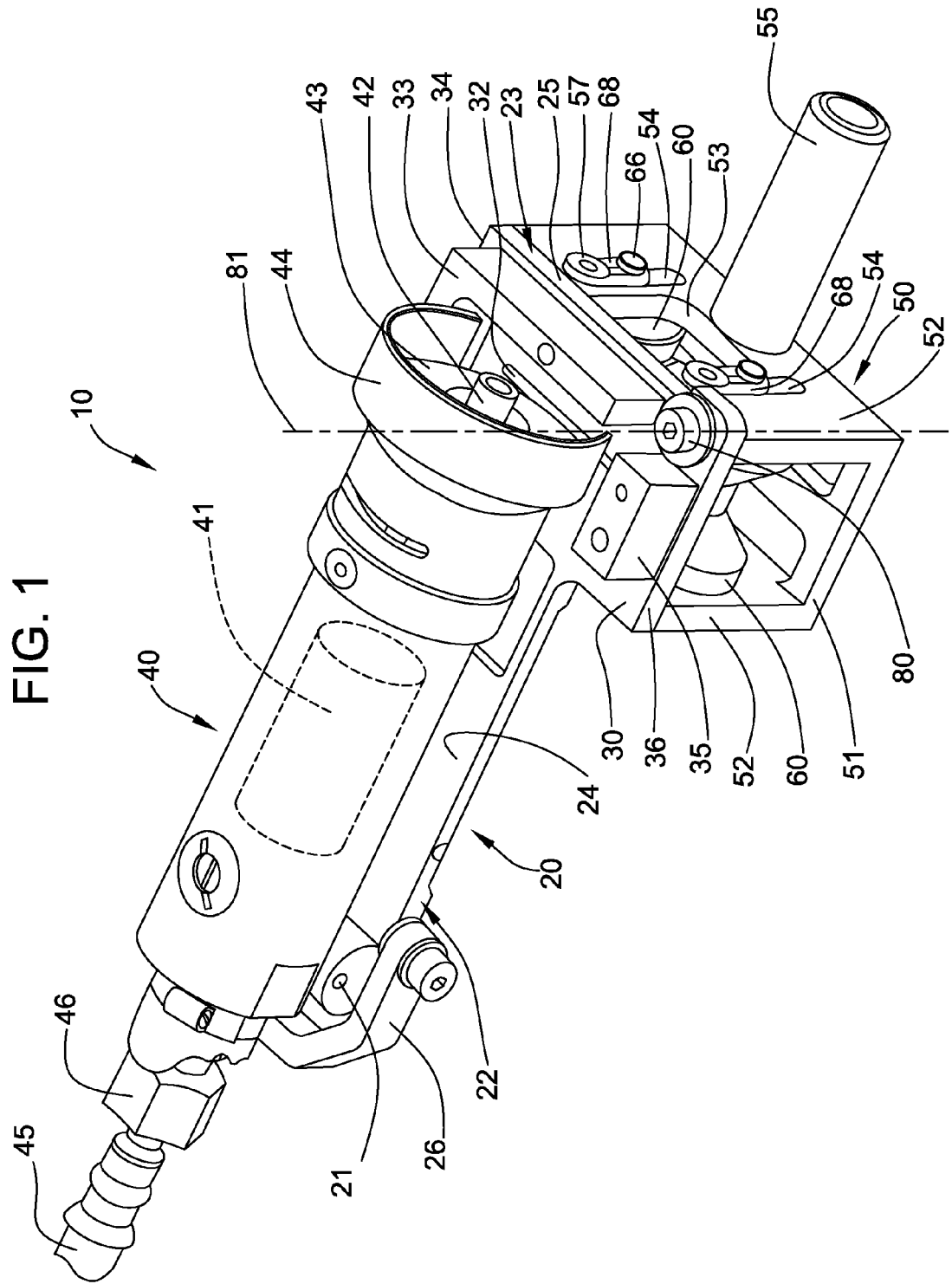
FIG. 1 is a perspective view of a tool in accordance with the disclosure.

Referring to FIGS. 1-2, a tool 10 for cutting and stripping the shield 71 of a cable 70 is depicted. Tool 10 may include a base 20 with a cutting section 30 and a cylindrical body 40 pivotally mounted on the base. A fixture 50 may be pivotally connected to the base 20 adjacent the cutting section 30. Tool 10 is configured to permit the shield 71 of cable 70 to be both ring cut in a direction generally circumferentially around the cable 70 and slit in a direction generally parallel to the longitudinal axis 72 of cable 70 by changing the orientation of the cable 70 relative to tool 10.

Cable 70 may be configured in many different ways. In one embodiment depicted in FIG. 4, the cable has an outer conductive metal shield 71 and a plurality of elongated components within the shield. The elongated components may include a plurality of insulated electrical conductors 74 and a plurality of uninsulated electrical conductors 78 that extend the length of the cable. In addition, cable 70 may also include an outer insulative layer (not shown) as well as an inner wrap or sheath (not shown) that extends around the insulated conductors 74 and the uninsulated conductors 78.

Base 20 may be an elongated generally planar member with the body 40 pivotally mounted along pivot axis 21 adjacent a first end 22 of the base. Cutting section 30 is adjacent a second end 23 of the base 20, opposite the first end 22. Base 20 further includes an upper surface 24 that faces and interacts with a lower surface of body 40 to define the cutting depth of the tool 10 as well as engage a switch or trigger mechanism 47 of body 40. An adjustable stop 28 may be provided on upper surface 24 to define the depth that cutting blade 43 cuts into shield 71 of cable 70.

Cutting section 30 is positioned at the second end 23 of base 20 and above fixture 50. A lower surface of cutting section 30 opposite upper surface 24 defines a cutting platform 31 against which an outer surface 73 of shield 71 of cable 70 is positioned. Cutting platform 31 may be generally planar. More specifically, the outer surface 73 of cable 70 is forced against and contacts the lower surface or cutting platform 31 to increase the repeatability and the precision of cutting operations. Cutting section 30 has an elongated, generally linear slot 32 generally adjacent second end 23 that extends generally perpendicularly to the longitudinal axis 38 (FIG. 7) of base 20. An L-shaped first block 33 may be mounted on upper surface 24 along a forward edge 25 of base 20 and along a first lateral edge 34 of the cutting section 30. A second rectangular block 35 may be mounted on the upper surface 24 along a second lateral edge 36 of cutting section 30, opposite the first lateral edge 34. The first block 33 and second block 35 cooperate to define a generally U-shaped guard along the forward edge 25 of base 20 and the first lateral edge 34 and the second lateral edge 36 of cutting section 30 to protect a user from accidentally contacting the cutting blade 43 while operating the tool 10.

A generally U-shaped alignment guide 26 may be pivotally mounted on base 20 generally adjacent first end 22. The alignment guide 26 may have a generally flat lower surface 27 that is configured to engage the outer surface 73 of cable 70 during a ring cut operation to assist in maintaining a constant angle between the cutting blade 43 and the shield 71 of cable 70.

Body 40 may be mounted on base 20 for pivotal movement about pivot axis 21. A motor or drive mechanism 41 may be mounted within body 40 to rotatably drive shaft 42 and cutoff wheel or cutting blade 43 that is mounted on the shaft 42. Cutting blade 43 may be generally planar and define a cutting plane. A blade guard 44 may extend in an arc around cutting blade 43. Blade guard 44 extends around a portion of the circumference of cutting blade 43 so that a lower portion of the cutting blade extends past the blade guard and may be inserted into slot 32 in cutting section 30 of base 20 without the blade guard interfering or engaging base 20. Blade guard 44 may be configured to extend around cutting blade 43 a sufficient distance or arc-length such that a user will be protected from inadvertent contact with cutting blade 43.

Motor or drive mechanism 41 may be driven by various power sources including those that are pneumatic or electrical (including battery powered). As depicted, drive mechanism 41 is configured with a pneumatic motor and includes an air hose 45 extending from an end of the body 40. If desired, air hose 45 may be connected with a rotatable ball joint 46 to increase the flexibility of movement of tool 10 during the cutting process.

Fixture 50 may include a generally flat bottom wall 51 and a pair of spaced apart, upwardly extending support walls 52. Each support wall 52 may have a generally rectangular ring cut cable opening 53 (FIGS. 3-4) horizontally centered relative to the support wall and a pair of vertical slots 54 positioned on opposite sides of the ring cut cable opening 53. An elongated handle 55 may extend from one of the support walls 52 opposite body 40 and be positioned beneath ring cut cable opening 53 and centered along the support wall 52. A fixed post 56 may be secured to each support wall 52 generally adjacent an upper edge of each vertical slot 54. An end 57 of each fixed post 56 extends outside or beyond the support walls 52.

A pair of spaced apart rollers 60 are rotatably and moveable mounted on fixture 50 and extend between support walls 52. Each roller may have a generally V-shaped profile with a pair of generally flat round outer surfaces 61 and a generally flat inner surface 62. A generally uniform tapered surface 63 may extend between each of the outer surfaces 61 and the inner surface 62. Each roller 60 may be rotatably mounted on a slidable post 64 having a roller axis 65. The slidable posts 64 may be positioned within and configured for vertical or linear movement within vertical slots 54 of support walls 52. An end 66 of each slidable post 64 may extend outside or beyond the support walls 52. A spring biasing or elastomeric member 68 such as a resilient band or o-ring may extend around the fixed post 56 and its adjacent slidable post 64. The elastomeric member 68 engages the end 57 of the fixed post 56 and the end 66 of the slidable post 64 and biases the rollers towards the fixed posts 56. This configuration allows each of the rollers 60 to move vertically along vertical slots 54 with a spring bias that pulls rollers 60 upward towards the cutting platform 31.

As best seen in FIG. 3, the outer surfaces 61 of rollers 60 combine with the cutting platform 31 to create a first cable support that defines a ring cut nest 75 that extends through ring cut cable opening 53. Vertical movement of the rollers 60 along their respective vertical slots 54 permits ring cut nest 75 to be adjustable and receive cables 70 of different diameters.

The V-shaped profile of rollers 60 and cutting platform 31 create a second cable support that defines slitting nest 76 (FIG. 2) that accommodates a cable 70 that is inserted within fixture 50 and extends between support walls 52 and above rollers 60. More specifically, the V-shaped profile provides support to the 70 cable so that the tapered surfaces 63 of each roller 60 may engage a lower surface of cable 70 while the cutting platform 31 engages an upper surface of cable 70. The resilient nature of elastomeric members 68 provides a spring bias to force cable 70 against the cutting platform 31. With this configuration and the orientation of cutting blade 43, the outer surface 73 of cable 70 may be cut along a first or ring cut plane that is generally perpendicular to the longitudinal axis 72 of cable 70 and a second or slitting cut plane that is generally along or parallel to the longitudinal axis 72 of cable 70 Cutting blade 43 defines the ring cut plane and the slitting cut plane. As such, fixture 50 permits tool 10 to perform a ring cut operation (i.e., generally perpendicular to longitudinal axis 72) on the shield 71 of cable 70 by positioning the cable through the ring cut nest 75 and to perform a slitting operation (i.e., generally parallel to longitudinal axis 72) on the shield 71 by positioning the cable within the slitting nest 76. Accordingly, the ring cut and the slitting cut operations occur generally perpendicular to each other relative to the cable 70.

Body 40 may be configured to be pivoted on base 20 between a pre-cut or first position at which the cutting blade 43 is spaced from cutting platform 31 and a cutting or second position at which the body 40 is pivoted and the cutting blade 43 extends through slot 32 and past or below cutting platform 31. The distance that the cutting blade 43 extends below the surface of cutting platform 31 defines the depth that the cutting blade cuts into the outer surface 73 of shield 71 of cable 70. This distance may be set by the stop 28 on upper surface 24 that engages the lower surface of body 40. A spring 48 may be provided between body 40 and upper surface 24 to bias the body 40 away from base 20 and the cutting position.

Base 20 may be mounted on fixture 50 and movable between a cutting position at which the cable 70 may be ring cut or slit and one of a plurality of loading positions at which the cable may be loaded or inserted into the fixture 50. More specifically, base 20 may be pivotally or rotatably secured to fixture 50 by a bolt 80 that extends through a hole (not shown) in cutting section 30 and secured to one of the support walls 52 of fixture 50. Bolt 80 defines an axis 81 about which base 20 may rotate relative to fixture 50. The rotation of base 20 allows the base and body 40 to move from a cutting position (FIGS. 1-4, 5 and 7) at which the base 20 is aligned with fixture 50 so that a either a ring cut or stripping operation may be carried out (depending on the orientation of cable 70).

Figure 6:
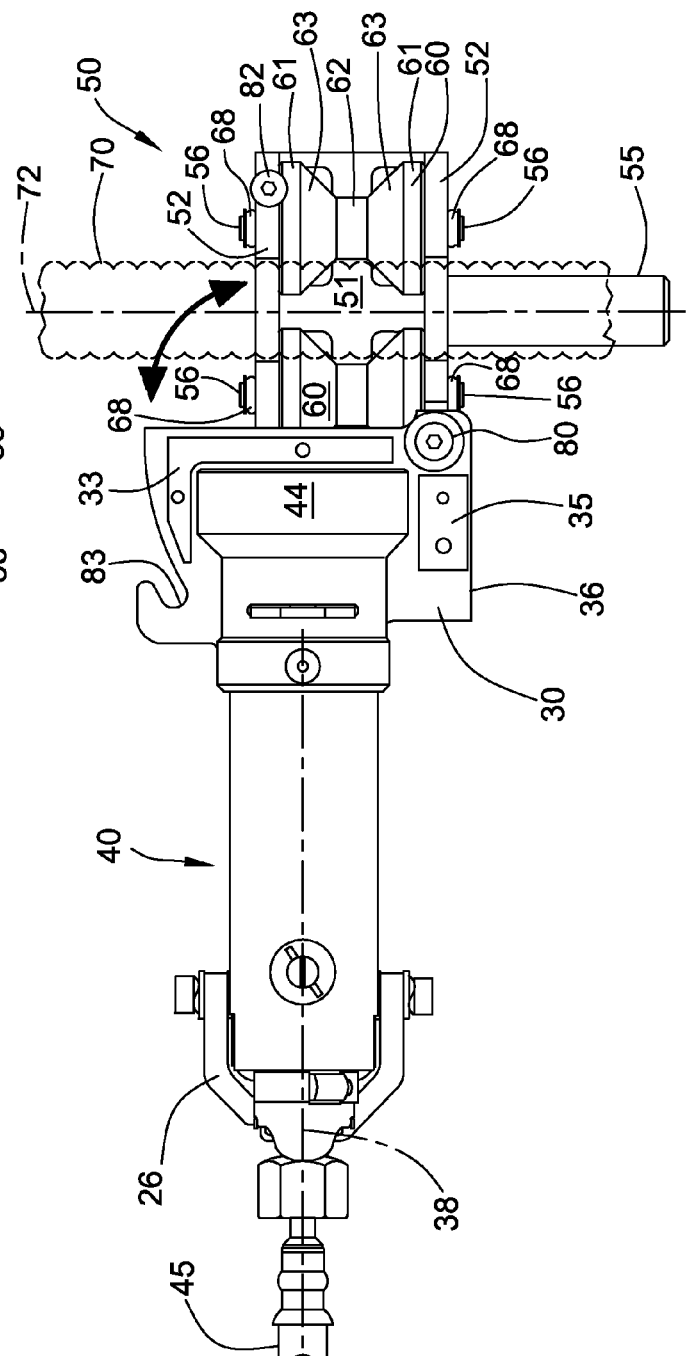
FIG. 6 is a top plan view similar to FIG. 5 but with the fixture in a ring cut loading position.

Base 20 and body 40 may be rotated about axis 81 to one of a plurality of loading positions at which the cable 70 may be loaded into fixture 50. Examples of two loading positions are depicted in FIGS. 6 and 8. In FIG. 6, base 20 and body 40 have been rotated to a loading position at which the support walls 52 of fixture 50 are generally parallel to base 20 and generally perpendicular to the plane of cutting blade 43. Upon loading cable 70 into ring cut nest 75 in such an orientation, the longitudinal axis 72 of the cable is generally parallel to the plane of cutting blade 43. In FIG. 8, base 20 and body 40 have been rotated to a loading position at which the support walls 52 of fixture 50 are generally perpendicular to base 20 and generally parallel to the plane of cutting blade 43. Upon loading cable 70 into slitting nest 76 in such an orientation, the longitudinal axis 72 of the cable is generally parallel to the plane of cutting blade 43. A plurality of other orientations of the base 20 and body 40 are possible that will facilitate loading of cable 70 into fixture 50.

A second bolt or stud 82 that acts as a stop member may extend upward from the other support wall 52 at a position generally diagonally across the fixture 50 from bolt 80. An arcuate slot 83 may extend inwardly along the first lateral edge 34 of cutting section 30 generally towards first end 22 of base 20 and is dimensioned to receive stud 82 therein. The end of slot 83 is configured to engage stud 82 and act as an engagement member to limit pivotal or rotational movement of the base 20 relative to fixture 50 when the cutting section 30 is aligned with fixture 50. In such a configuration, upon fully inserting stud 82 into slot 83, the cutting section 30 is operatively aligned with fixture 50 to permit the ring cut and slitting operations to occur.

INDUSTRIAL APPLICABILITY

The industrial applicability of the system described herein will be readily appreciated from the foregoing discussion. The present disclosure is applicable to tools 10 for cutting and slitting the shield 71 of a cable 70 having insulated conductors 74 and/or uninsulated conductors 78 therein. The tool 10 may be include a cutting platform 31 against which the outer surface 73 of the cable 70 is secured during a cutting or slitting operation. A cutting blade 43 engages and cuts the shield 71. Cutting blade 43 may be configured to cut the shield 71 without significantly forcing or deforming the shield inward toward the insulated conductors 74 or the uninsulated conductors 78. Such inward deformation of the shield 71 may increase the effort required to remove the cut section of the shield from the remaining portion of the cable 70.

A fixture 50 may be provided to support the cable 70 during the cutting and stripping operations. The fixture may include a first cable support defining a ring cut plane and a second cable support defining a slitting plane. The fixture may be configured to receive cables 70 having a range of diameters without the need for manually adjusting the fixture 50 in which they are received. The fixture 50 may have a pair of spaced apart rollers 60 that, in part, form the first cable support and the second cable support. The rollers 60, together with cutting platform 31, may define a ring cut nest 75 and a slitting nest 76 of the fixture 50.

Figure 5:
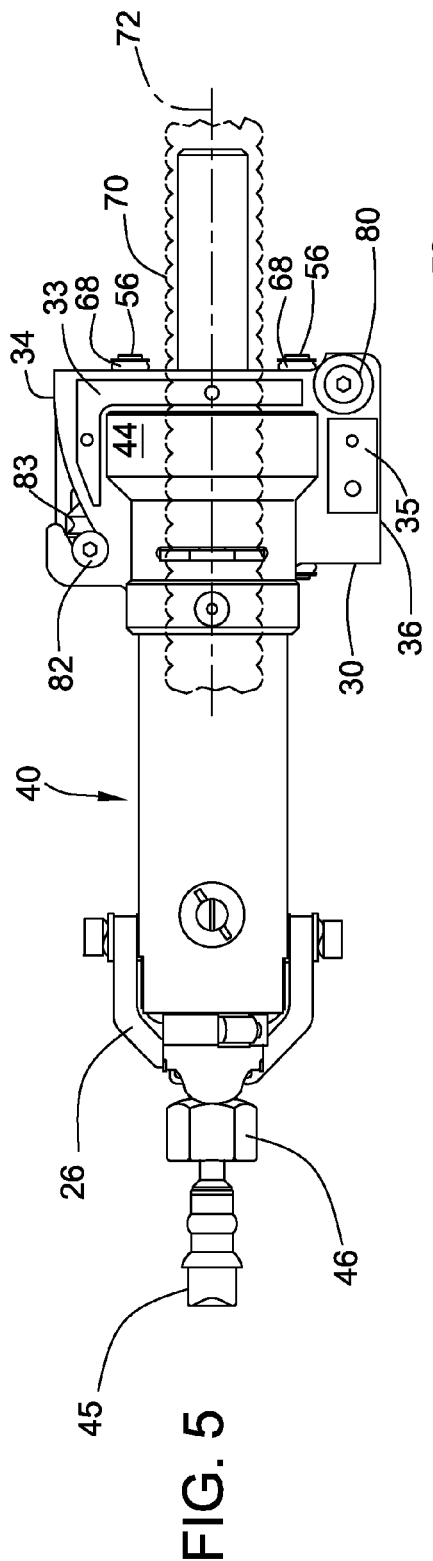
FIG. 5 is a top plan view of the tool of FIG. 1 with a cable depicted in phantom and oriented for a ring cut.

In operation, the cutting depth that cutting blade 43 extends past cutting platform 31 is set by adjusting the stop 28 on the upper surface 24 of base 20. Base 20 may be rotated relative to fixture 50 about axis 81 in order to provide access to fixture 50. To initiate a ring cut around the outer surface 73 of cable 70, the cable is generally aligned with handle 55 and positioned within ring cut nest 75 so that the outer surface 73 of cable 70 engages the outer surfaces 61 of the rollers 60 as best seen in FIG. 6. Base 20 having body 40 mounted thereon may be rotated relative to fixture 50 about axis 81 to the operative cutting position as depicted in FIG. 5. As the base 20 is rotated, the cutting platform engages the top of the cable 70 and applies a downward force. The downward force on cable 70 is transferred to the outer surfaces 61 of rollers 60 and the elastomeric members 68 are stretched or extend downward as depicted by arrows 58 to increase the size of the ring cut nest 75 to accommodate the cable 70. By utilizing rollers 60 that are resiliently biased upward by elastomeric member 68, fixture 50 may automatically accommodate cables 70 having a range of diameters without the need to adjust fixture 50 or another aspect of tool 10. In other words, the movable nature of rollers 60 combined with the elastomeric members 68 force the top of the cable 70 into engagement with cutting platform 31 for a wide range of cable diameters without the need to adjust or move components of fixture 50.

Once the cable 70 is positioned within ring cut nest 75 and fixture 50 is aligned with cutting section 30, body 40 may be pivoted about pivot axis 21 to move cutting blade 43 downward and through slot 32. As the body 40 pivots towards base 20, the trigger mechanism 47 on body 40 engages the base 20 and activates drive mechanism 41 to drive cutting blade 43 in a rotating manner. The bottom edge of the cutting blade 43 is configured by a user to extend past the cutting platform 31 a predetermined distance to cut the outer surface 73 of shield 71 of cable 70 to a predetermined depth. Since the rollers 60 and elastomeric members 68 force the top surface of the cable against the cutting platform 31 and the depth that the cutting blade 43 extends past the cutting platform 31 is pre-set, the tool 10 is able to make repeated cuts through the shield 71 of cables 70 in a consistent manner.

After the body 40 is pivoted downward or towards base 20 so that cutting blade 43 cuts through the outer surface 73 of shield 71, tool 10 may be rotated circumferentially around cable 70 three hundred and sixty degrees to complete the ring cut operation. If desired, the alignment guide 26 may be set to a predetermined angle to assist in maintaining a desired alignment between the cutting blade 43 and the shield 71. In particular, it may be desirable to set for the plane of the cutting blade 43 to be generally perpendicular to longitudinal axis 72 of cable 70. Alignment guide 26 may be configured so that the lower surface 27 thereof engages the outer surface 73 of cable 70 as the tool 10 is rotated about the cable 70.

Once the ring cut has been completed, it may be desirable to remove a section of the shield 71 of cable 70. In some circumstances, it may be possible to slide the cut section of the shield 71 from the remaining cable by sliding the cut section along the longitudinal axis 72 of the cable. In instances in which it is not possible to slide the cut section of the shield 71 from cable 70 due to the tightness of the engagement between the shield 71 and the remaining portion of the cable 70, it may desirable to slice or slit the outer surface 73 of shield 71 in direction generally parallel to or along longitudinal axis 72. In such case, the base 20 may be rotated away from the cutting position depicted in FIG. 7 to the position depicted in FIG. 8. The cable 70 may be positioned so as to be generally aligned with and engage the inner surfaces 62 of each of the rollers 60 and thus be positioned generally within the slitting nest 76. As such, the longitudinal axis 72 of cable 70 is positioned generally parallel to a plane through cutting blade 43. The base 20 and body 40 may then be rotated about axis 81 relative to fixture 50 until the base 20 is positioned with cutting section 30 over fixture 50 and with stud 82 positioned within slot 83.

Rotation of base 20 causes cutting platform 31 to engage the top of cable 70 and force the outer surface 73 of cable 70 into engagement or contact with the tapered surfaces 63 of the rollers 60. The vertical slots 54 together with the elastomeric members 68 permit the rollers 60 to move downward to automatically accommodate cables 70 without the need to adjust fixture 50. Such a structure causes the top of the cable 70 to be forced up against cutting platform 31 to provide a cut through the shield 71 of a consistent depth. Body 40 may then be rotated or pivoted downward so that cutting blade 43 extends through slot 32 and the trigger mechanism 47 of body 40 engages upper surface 24 of base 20 to activate drive mechanism 41. Tool 10 may be slid along the longitudinal axis 72 of cable 70 in order to cut the shield 71 along a path that is generally parallel to the longitudinal axis 72 of the cable 70. Handle 55 may be provided so that a user may hold the tool 10 with one hand on the body 40 and a second hand on the handle 55 to facilitate a relatively straight cut. It should be noted that bolt 80 and stud 82 together with slot 83 may be positioned so that a pulling or pushing movement of the tool 10 along a path generally parallel to longitudinal axis 72 causes further engagement of the stud 82 within slot 83. As such, an additional locking mechanism holding the base 20 in the operative cutting position relative to fixture 50 may not be necessary.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The term "generally" as used herein means that deviations are permissible so long as performance is not impaired to the point of making the tool unusable because of the deviation.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A tool for cutting a metal shield of a cable, the cable having a core containing a plurality of electrical conductors, the tool comprising:
   a base including a cutting platform, the cutting platform being configured to engage an outer surface of the cable;
   a cutting blade mounted for movement relative to the cutting platform between a first position spaced from the cutting platform and a second position at which the cutting blade extends past the cutting platform, the cutting blade defining a cutting plane when at the second position;
   a drive mechanism operatively connected to the cutting blade; and a fixture for supporting the cable in a desired orientation, the fixture including first and second spaced apart rollers, the first roller configured to rotate about a first axis and the second roller configured to rotate about a second axis, the first axis being spaced from the second axis to define a cable receiving nest extending between the first axis and the second axis, the first and second rollers being configured to support and engage the cable for a ring cut and to support and engage the cable for a slitting cut, the ring cut and the slitting cut being generally perpendicular to each other, the base being pivotably secured to the fixture to permit the base and the fixture to pivot relative to each other about a pivot axis between a loading position and a cutting position, the pivot axis spaced from and parallel to and the cutting plane, wherein at the loading position the cable receiving nest is pivoted about the pivot axis to a position spaced from the cutting plane, and at the cutting position the cable receiving nest intersects with the cutting plane.

2. The tool of claim 1, wherein each roller has a generally V-shaped profile that defines in part a slitting nest into which the cutting blade extends to make the slitting cut, and each roller has a round outer surface that defines in part a ring cut nest into which the cutting blade extends to make the ring cut.

3. The tool of claim 1, wherein each roller is generally linearly movable on the fixture along a path generally perpendicular to the cutting platform.

4. The tool of claim 3, wherein the rollers are spring biased towards the cutting platform.

5. The tool of claim 1, wherein the cutting platform is generally planar.

6. The tool of claim 1, wherein the cutting blade and the drive mechanism are mounted to a body, and the body is movable between the first position spaced from the cutting platform and the second position at which the cutting blade extends past the cutting platform towards the fixture.

7. The tool of claim 6, wherein the cutting blade is rotatably driven by the drive mechanism.

8. The tool of claim 1, wherein one of the base and the fixture includes a stop member, and the other of the base and the fixture includes an engagement member configured to engage the stop member to limit rotational movement of the base relative to the fixture.

9. The tool of claim 1, wherein the fixture includes a generally rectangular support structure and the first and second rollers are rotatably mounted on the support structure, the support structure being pivotably mounted on the base to pivot about the pivot axis.

10. The tool of claim 9, wherein the pivot axis is positioned at a first corner of the support structure and a stop member to limit pivotal movement of the support structure is positioned at a second corner, opposite the first corner.

11. A tool for cutting a metal shield of a cable, the cable having a core containing a plurality of electrical conductors, the tool comprising:
    a base including a cutting platform, the cutting platform being configured to engage an outer surface of the cable;
    a cutting blade mounted for movement relative to the cutting platform between a first position spaced from the cutting platform and a second position at which the cutting blade extends past the cutting platform, the cutting blade defining a cutting plane when at the second position;
    a drive mechanism operatively connected to the cutting blade; and
    a fixture for supporting the cable in a desired orientation, the fixture including first and second spaced apart rollers, a pair of spaced apart first surfaces of each of the first and second rollers defining a ring cut nest extending between the first surfaces to support and engage the cable for a ring cut, and a pair of spaced apart second surfaces of each of the first and second rollers defining a slitting nest extending between the second surfaces to support and engage the cable for a slitting cut, the ring cut and the slitting cut being generally perpendicular to each other, the base being pivotably secured to the fixture to permit the base and the fixture to pivot relative to each other about a pivot axis between a loading position and a cutting position, the pivot axis spaced from and parallel to the cutting plane, wherein at the loading position both the ring cut nest and the slitting nest are spaced from the cutting plane and allow the cable to be loaded into either the ring cut nest or the slitting nest, and at the cutting position both the ring cut nest and the slitting nest intersect with the cutting plane.

12. The tool of claim 11, wherein the fixture includes a generally rectangular support structure and the first and second rollers are rotatably mounted on the support structure, the support structure being pivotably mounted on the base to pivot about the pivot axis.

13. The tool of claim 12, wherein the axis is positioned at a first corner of the support structure and a stop member to limit pivotal movement of the support structure is positioned at a second corner, opposite the first corner.

* * * * *